United States Patent
Hung et al.

(10) Patent No.: US 8,351,548 B2
(45) Date of Patent: Jan. 8, 2013

(54) SIGNAL PROCESSING SYSTEM AND METHOD THEREOF

(75) Inventors: Shao-Ping Hung, Hsinchu Hsien (TW); Tien-Hsin Ho, Hsinchu Hsien (TW); Ching-Hsiang Chuang, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 88 days.

(21) Appl. No.: 12/959,598

(22) Filed: Dec. 3, 2010

(65) Prior Publication Data

US 2011/0134985 A1 Jun. 9, 2011

(30) Foreign Application Priority Data

Dec. 4, 2009 (TW) .............................. 98141544 A

(51) Int. Cl.
*H03K 9/00* (2006.01)

(52) U.S. Cl. ........ 375/316; 375/136; 375/147; 375/149; 375/150; 375/343; 375/347; 375/350

(58) Field of Classification Search ................... 375/316, 375/136, 147, 149, 150, 343, 347, 350; 370/328, 370/350

See application file for complete search history.

(56) References Cited

U.S. PATENT DOCUMENTS 6,798,853 B1 * 9/2004 Lindbom et al. .............. 375/344
8,005,221 B2 * 8/2011 Chester et al. ................ 380/263

OTHER PUBLICATIONS

Wei Ye "Weighted least squares estimation of phase errors for SAR/ISAR autofocus" IEEE transcations on geoscience and remote sensing, vol. 37, No. 5, Sep. 1999.*

* cited by examiner

*Primary Examiner* — Dhaval Patel

(74) *Attorney, Agent, or Firm* — Andy M. Han; Han IP Law PLLC

(57) ABSTRACT

A signal processing system is provided. The system includes a calculating apparatus, for calculating a phase error of a received signal and generating a weight according to the phase error; a signal adjusting apparatus, coupled to the calculating apparatus, for generating a plurality of soft values according to the weight and the received signal; and a decoder, coupled to the signal adjusting apparatus, for decoding the soft values to generate data.

16 Claims, 11 Drawing Sheets

SIGNAL PROCESSING SYSTEM AND METHOD THEREOF

CROSS REFERENCE TO RELATED PATENT APPLICATIONS

This patent application claims priority from Taiwan Patent Application No. 098141544, filed in the Taiwan Patent Office on Dec. 4, 2009, entitled "Signal Processing System and Method Thereof", and incorporates the Taiwan patent application in its entirety by reference.

TECHNICAL FIELD

The present disclosure relates to a signal processing system, and more particularly to a signal processing system and method thereof according to a phase error of a signal to adjust the signal for improving decoding performance.

BACKGROUND OF THE PRESENT DISCLOSURE

FIG. 1 is a block diagram of a conventional signal processing system 10. The signal processing system 10 comprises a calculating apparatus 120, a demapper 140 and a decoder 180. The calculating apparatus 120 calculates a phase error $\Theta$ according to a part of the signal, such as the pilot signal, and further generates a phase calibration value $e^{j\Theta}$. The demapper 140 receives the signal, calibrates the signal phase according to the phase calibration value $e^{j\Theta}$ of the calculating apparatus 120 and then demaps the signal phase to generate a plurality of soft values. The decoder 180 decodes the soft values to the output data.

FIG. 2 is a block diagram of the calculating apparatus 120. The calculating apparatus 120 comprises phase calculation units 121, 122, 123 and 124, an adding unit 126, an averaging unit 128 and an exponential unit 129. The phase calculation units 121, 122, 123 and 124 receive the pilot signal $P_{-21}$, $P_{-7}$, $P_7$ and $P_{21}$ of the received signal respectively and calculate the individual phase of $P_{-21}$, $P_{-7}$, $P_7$ and $P_{21}$ respectively. The adding unit 126 adds the individual phase of $P_{-21}$, $P_{-7}$, $P_7$ and $P_{21}$ together and then calculates the average to obtain the phase error $\Theta$ by the averaging unit 128. Then, the exponential unit 129 generates the phase calibration value $e^{j\Theta}$. The calculating apparatus 120 is designed according to the specification of IEEE 802.11a/g, and its detail operation is acknowledged by the people skilled in the art, so it is not repeated here.

In the signal processing system, when the signal is received by the receiving end, the signal is affected by the noise, which causes the phase error, such as sampling time offset (STO), carrier frequency offset (CFO), phase noise and sampling clock offset (SCO), etc. In the skilled art, the conventional signal processing system only considers channel frequency response in a soft-output demapper the phase errors aroused from other causes still exist in the system, and hence the signal processing system 10 cannot process the received signals correctly.

Viterbi decoder 180 is a commonly used decoder to decode the transmitted data from soft values. Viterbi decoder is able to decode the signal with phase error correctly if the information of the phase error is known by the Viterbi decoder beforehand. Therefore, it is desirable to develop a signal processing system and method to adjust the signal according to the phase error, such that the signal processing system can have better performance.

SUMMARY OF THE PRESENT DISCLOSURE

It is one of the objectives of the present disclosure to provide a signal processing system and method thereof according to the phase error of the signal to adjust the signal to improve the decoding performance such that the signal processing system can have better performance.

The disclosure provides a signal processing system, comprising a calculating apparatus, for receiving a signal, calculating a phase error of the signal and generating a weight according to the phase error; a signal adjusting apparatus, coupled to the calculating apparatus, for receiving the signal and generating a plurality of soft values according to the weight and the signal; and a decoder, coupled to the signal adjusting apparatus, for decoding the soft values to generate a datum.

The disclosure further provides a signal processing method, comprising receiving a signal; analyzing the signal to obtain a phase error of the signal; obtaining a weight according to the phase error and a function; generating a plurality of soft values according to the weight and the signal; and decoding the soft values to generate a datum.

The present disclosure provides a signal processing system and method thereof for solving the phase error existing in the signal such that the decoder can receive the information about the phase error, the data can be more correctly decoded, and the signal processing system can have better performance.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF THE PREFERRED EMBODIMENT

Figure 1:
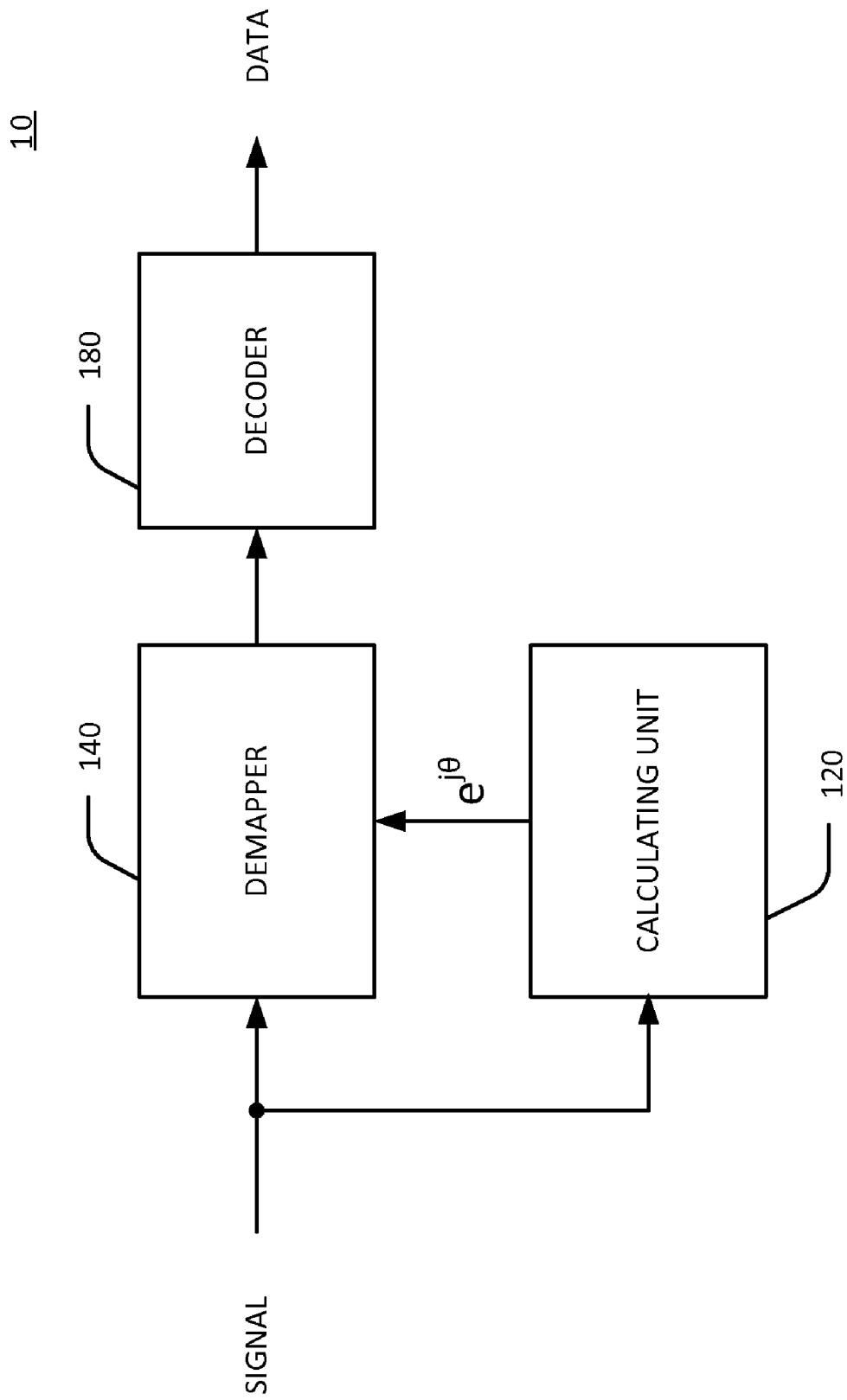
FIG. 1 is a block diagram of a conventional signal processing system.
Figure 2:
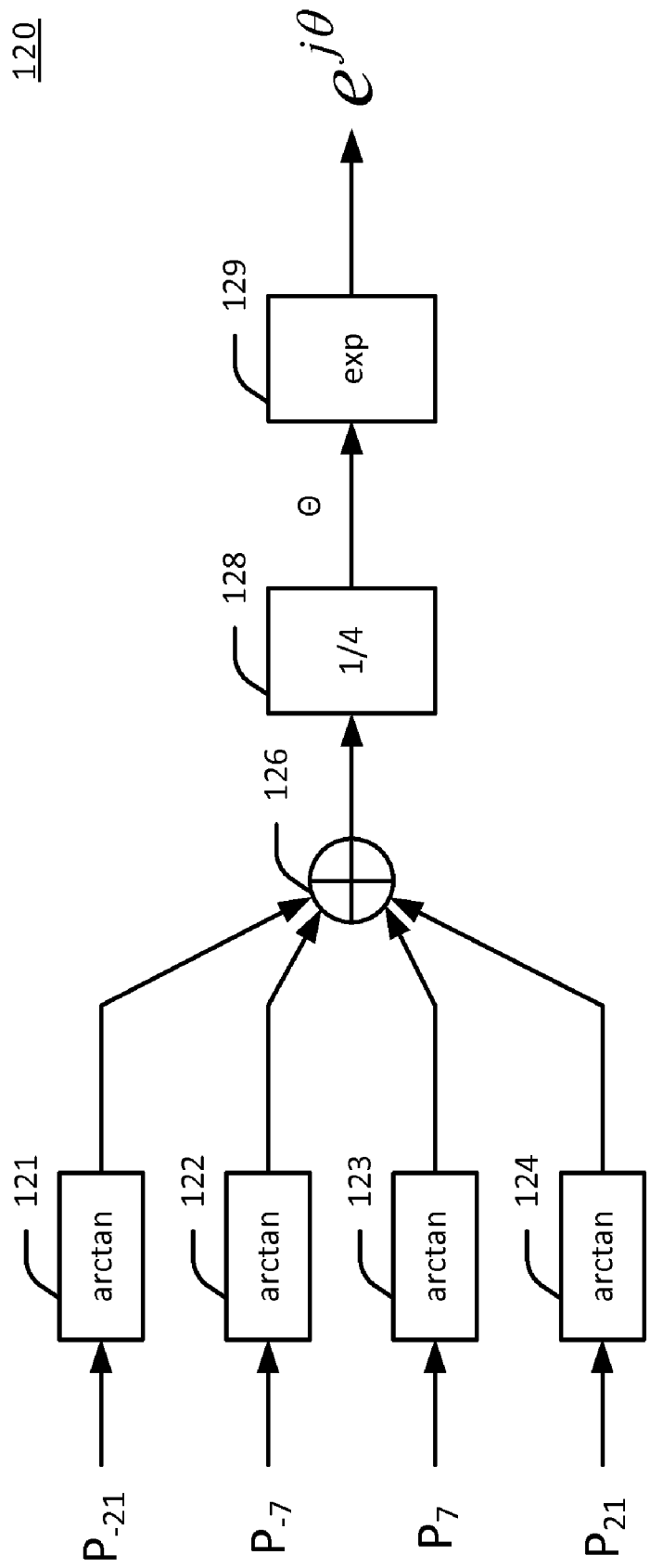
FIG. 2 is a block diagram of the calculating apparatus.
Figure 3:
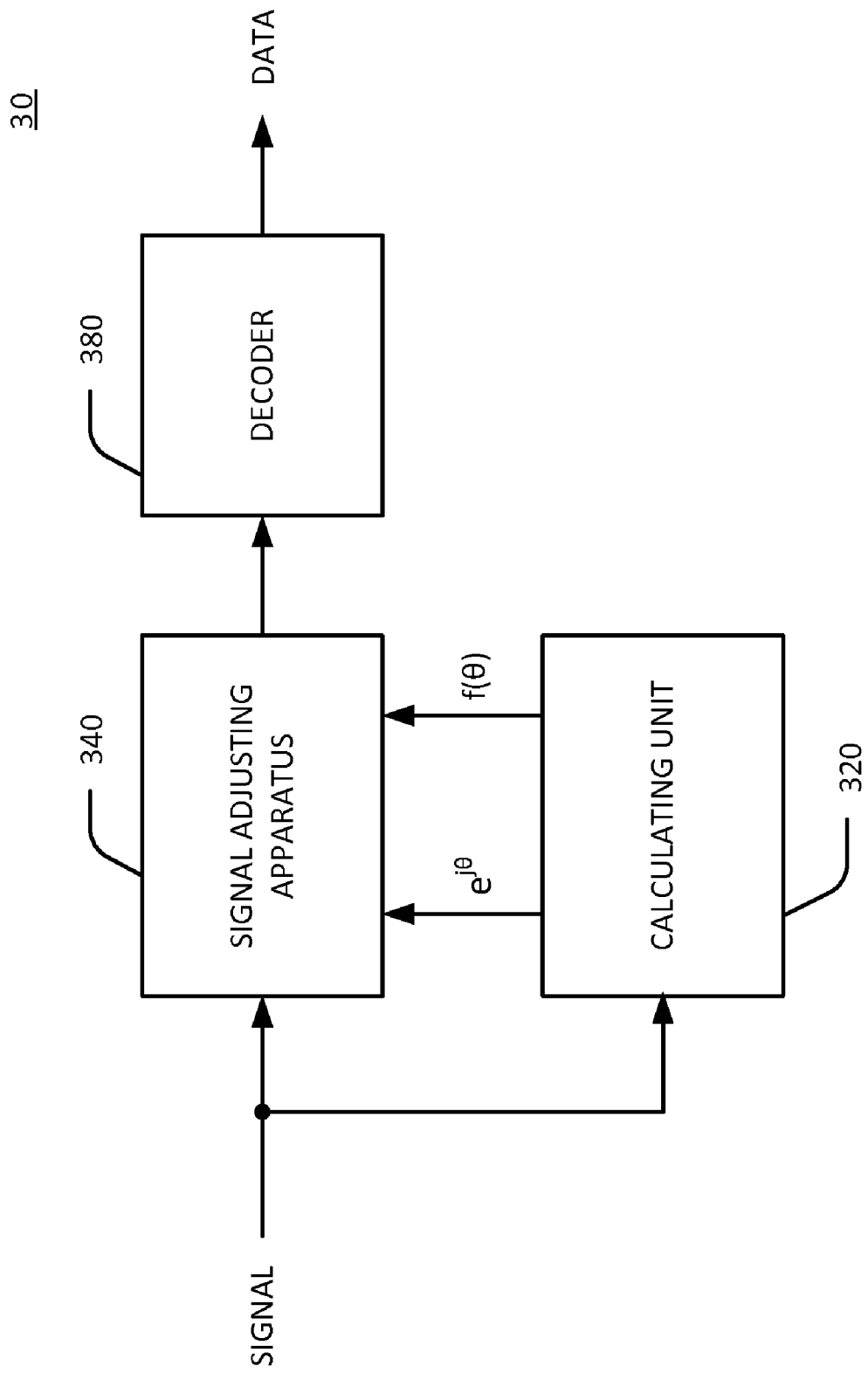
FIG. 3 is a block diagram of a signal processing system according to a first embodiment of the present disclosure.

FIG. 3 is a block diagram of a signal processing system 30 according to a first embodiment of the present disclosure. The system 30 is for processing received signals in accordance with an original signal transmitted from a remote end. The system 30 comprises a calculating apparatus 320, a signal adjusting apparatus 340 and a decoder 380.

The calculating apparatus 320 calculates a phase error Θ according to a part of the signal, such as a pilot signal, and generates a phase calibration value $e^{j\Theta}$. The calculating apparatus 320 obtains a weight f(Θ) according to a function f(x). The function is a function of the phase error, where x represent the variable phase error. For example, the weight f(Θ) is inversely proportional to the phase error Θ. The function f(x) is $f(x)=k1/(k2+x^i)$ for example, where k1 and k2 are real numbers, and i is positive. And, the signal comprises an in-phase signal (I signal) and a quadrature-phase signal (Q signal). The phase error is related to sampling time offset (STO), carrier frequency offset (CFO), phase noise or sampling clock offset (SCO).

The signal adjusting apparatus 340 receives the signal, adjusts the signal only according to the weight f(Θ) of the calculating apparatus 320 or according to both the weight f(Θ) of the calculating apparatus 320 and the phase calibration value $e^{j\Theta}$, and maps the adjusted signal to a plurality of soft values. The decoder 380 decodes the soft values to output data.

Figure 4:
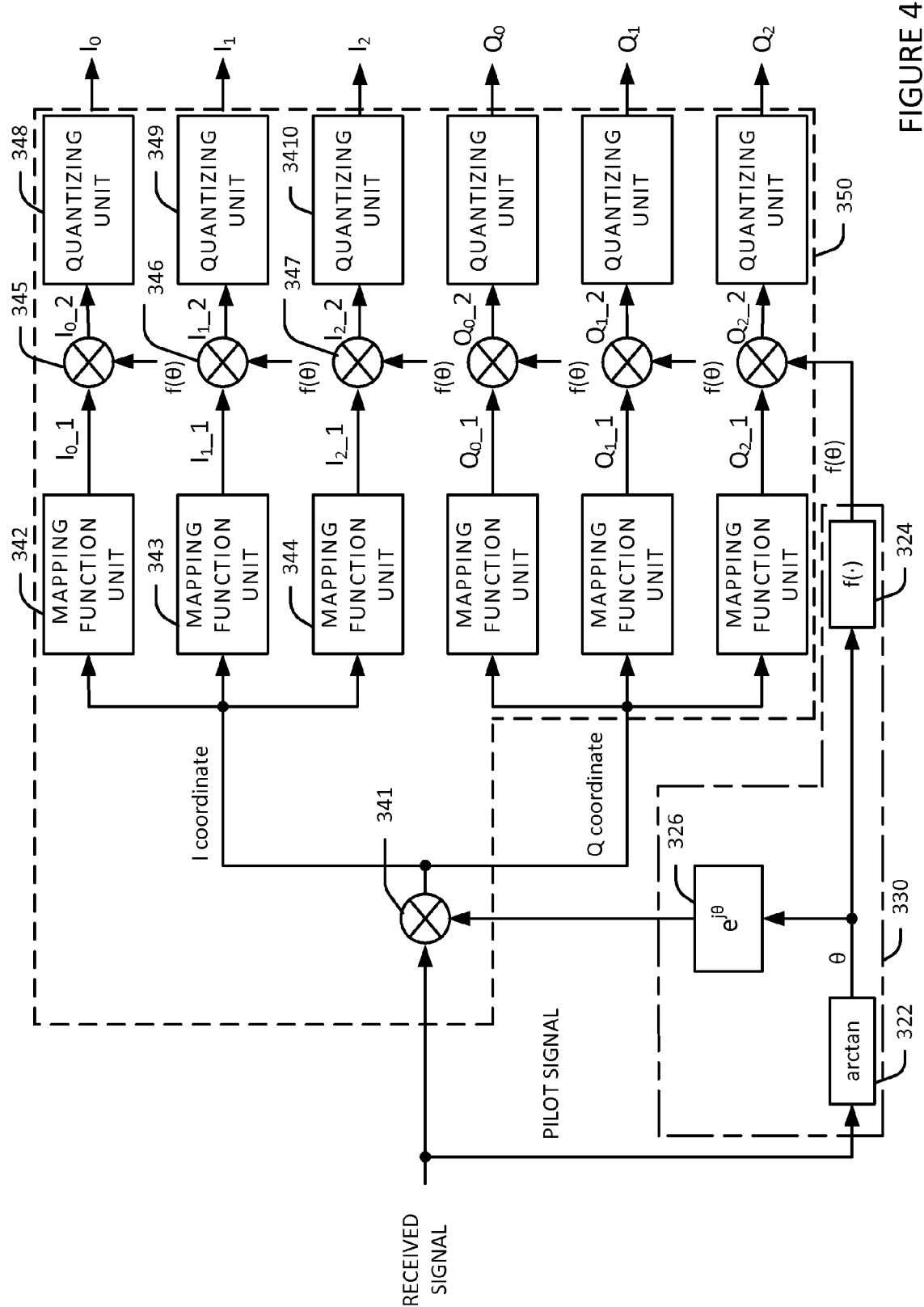
FIG. 4 is a detailed block diagram of the calculating apparatus and the signal adjusting apparatus according to the first embodiment.

FIG. 4 is a detailed block diagram of the calculating apparatus and 330 the signal adjusting apparatus according 350 of the first embodiment. The calculating apparatus 330 comprises a phase error calculating unit 322, a weight calculating unit 324 and a phase calibration value generating unit 326. The signal adjusting apparatus 350 at least comprises multipliers 341, 345, 346 and 347, function mapping units 342, 343 and 344, and quantizing units 348, 349 and 3410.

The phase error calculation unit 322 calculates the phase errorΘ according to the pilot signal. The weight calculating unit 324 calculates the weight f(Θ) according to the function. The phase calibration value generating unit 326 generates the phase calibration value $e^{j\Theta}$ according to the phase error. The multiplier 341 multiplies the signal by the phase calibration value $e^{j\Theta}$ to calibrate the signal. The signal adjusting apparatus 350 presents the calibrated signal as a complex number which includes I coordinate value (real number part) and Q coordinate value (imaginary number part). The following takes I coordinate value for example. The function mapping units 342, 343 and 344 according to the mapping function, such as:

$$\begin{cases} I_{0\_1} = I \\ I_{1\_1} = -|I| + 4 \\ I_{2\_1} = -||I| - 4| + 2 \end{cases}$$

The I coordinate value is mapped to the function values $I_{0\_1}, I_{1\_1}$ and $I_{2\_1}$. Then, the function values $I_{0\_1}, I_{1\_1}$ and $I_{2\_1}$ are multiplied by the weight f(Θ) by the multipliers 345, 346 and 347 to obtain adjusted values $I_{0\_2}, I_{1\_2}$ and $I_{2\_2}$. And, the adjusted values $I_{0\_2}, I_{1\_2}$ and $I_{2\_2}$ are quantized to generate the soft values $I_0, I_1$ and $I_2$ by the quantizing units 348, 349 and 3410.

For example, I coordinate value equals to 5.3, and hence the function values $I_{0\_1}=5.3, I_{1\_1}=-1.3$ and $I_{2\_1}=0.7$. For example, when f(x)=0.2/x and Θ=20, thus f(Θ)=0.01 and the adjusted values are $I_{0\_2}=0.053, I_{1\_2}=-0.013$ and $I_{2\_2}=0.007$. After quantized (such as unconditionally carried), the soft values become $I_0=1, I_1=-1$ and $I_2=1$. For Q coordinate, the calculation is similar, so it is not repeated here.

Figure 5:
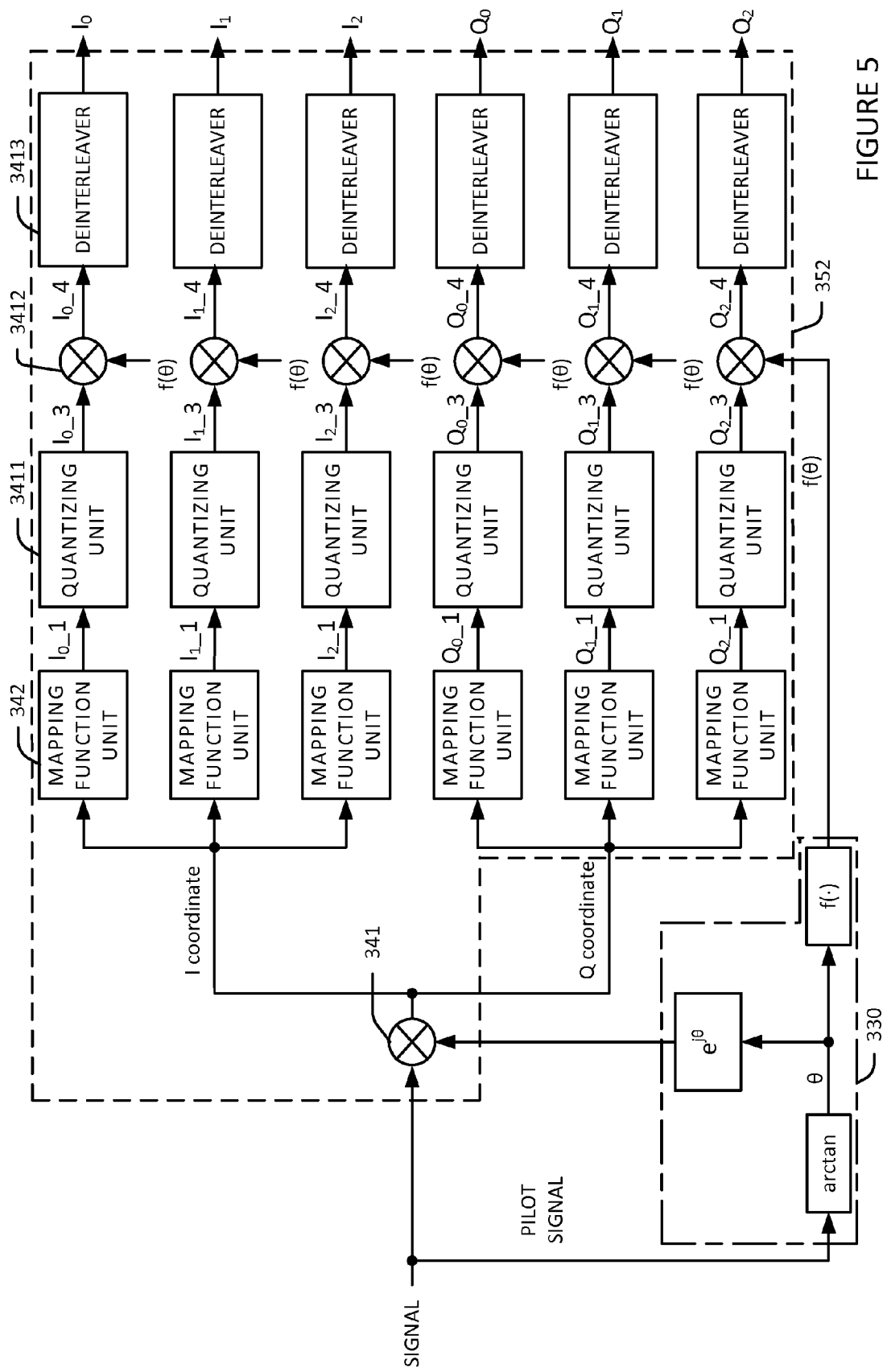
FIG. 5 is a detailed block diagram of the calculating apparatus and the signal adjusting apparatus according to the first embodiment.

FIG. 5 is a detailed block diagram of the calculating apparatus 330 and the signal adjusting apparatus 352 according to the first embodiment. In the embodiment, the function value $I_{0\_1}$ generated by the mapping function unit 342 is quantized by the quantizing unit 3411 to form intermediate values. Each intermediate value is then multiplied by the weight f(Θ) via the multiplier 3412 to generate the adjusted value $I_{0\_4}$. The adjusting value $I_{0\_4}$ is then deinterleaved by the deinterleaving unit 3413 to generate the soft value $I_0$. The method for generating the other soft values $I_1, I_2, Q_0, Q_1$ and $Q_2$ is similar to the above, so it is not repeated here.

Figure 6:
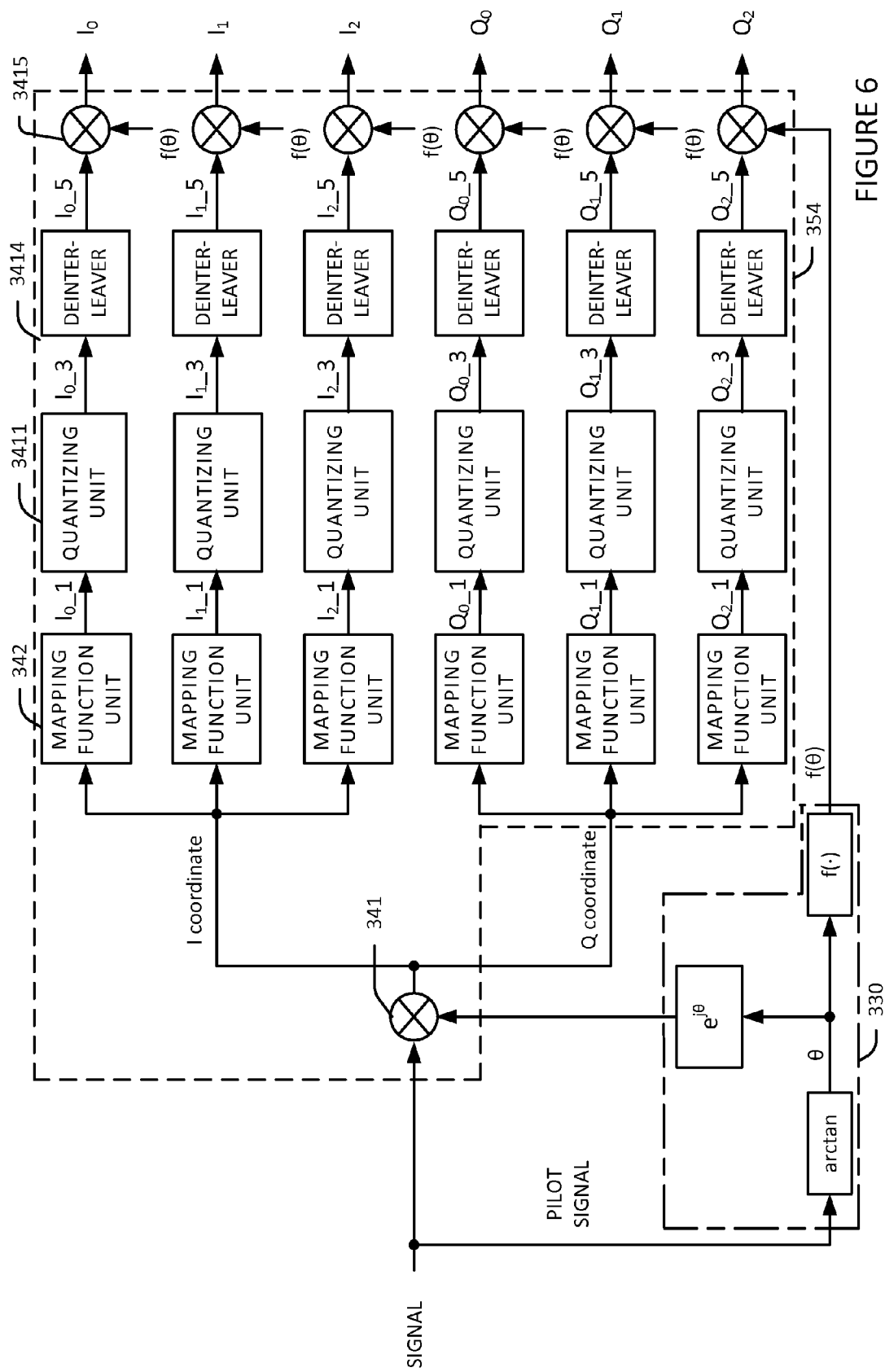
FIG. 6 is a detailed block diagram of the calculating apparatus and the signal adjusting apparatus according to the first embodiment.

FIG. 6 is a detailed block diagram of the calculating apparatus 330 and the signal adjusting apparatus 354 according to the first embodiment In the embodiment, the function value $I_{0\_1}$ generated by the mapping function unit 342 is quantized by the quantizing unit 3411 to form intermediate values $I_{0\_3}$. Each intermediate value $I_{0\_3}$ is deinterleaved by the deinterleaving unit 3414 to generate the deinterleaving value $I_{0\_5}$. The deinterleaving value $I_{0\_5}$ is then multiplied by the weight f(Θ) via the multiplier 3415 to have the soft value $I_0$. The method for generating the other soft values $I_1, I_2, Q_0, Q_1$ and $Q_2$ is similar to the above, so it is not repeated here.

Figure 7:
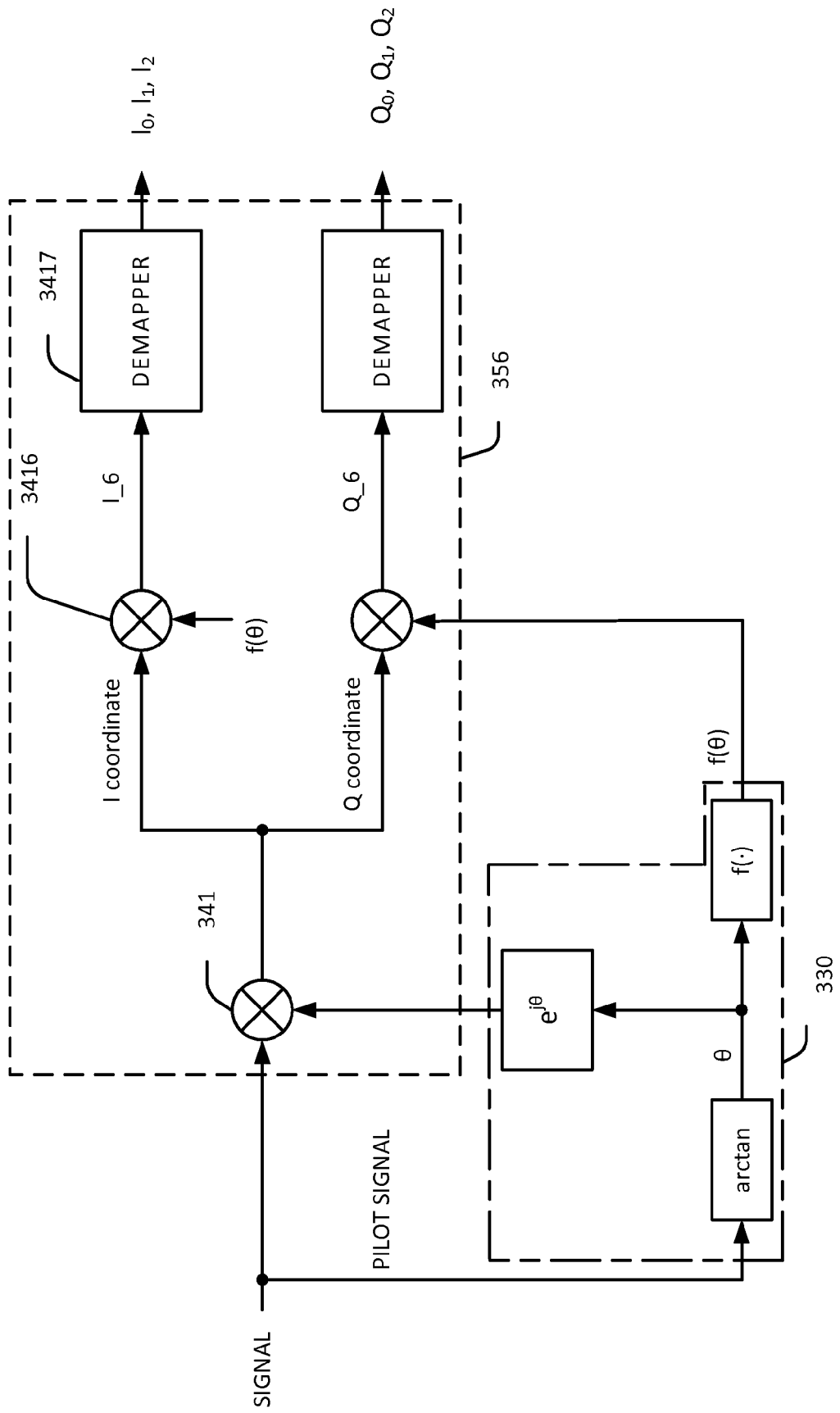
FIG. 7 is a detailed block diagram of the calculating apparatus and the signal adjusting apparatus according to the first embodiment.

FIG. 7 is a detailed block diagram of the calculating apparatus 330 and the signal adjusting apparatus 356 according to the first embodiment. In the embodiment, the I coordinate value is multiplied by the weight f(Θ) via the multiplier 3416 to generate the adjusting value I_6. The demapper 3417 demaps the adjusting value I_6 to the soft values $I_0, I_1$ and $I_2$. Since the weight f(Θ) is multiplied before the mapping function maps, so the former mapping function needs to be modified as follows:

$$\begin{cases} I_{0\_6}^* = I\_6 \\ I_{1\_6}^* = -|I\_6| + 4 \cdot f(\theta) \\ I_{2\_6}^* = -||I\_6| - 4 \cdot f(\theta)| + 2 \cdot f(\theta) \end{cases}$$

Calculation for Q coordinate is similar, and the rest operation is similar to the above, so it is not repeated here.

Figure 8:
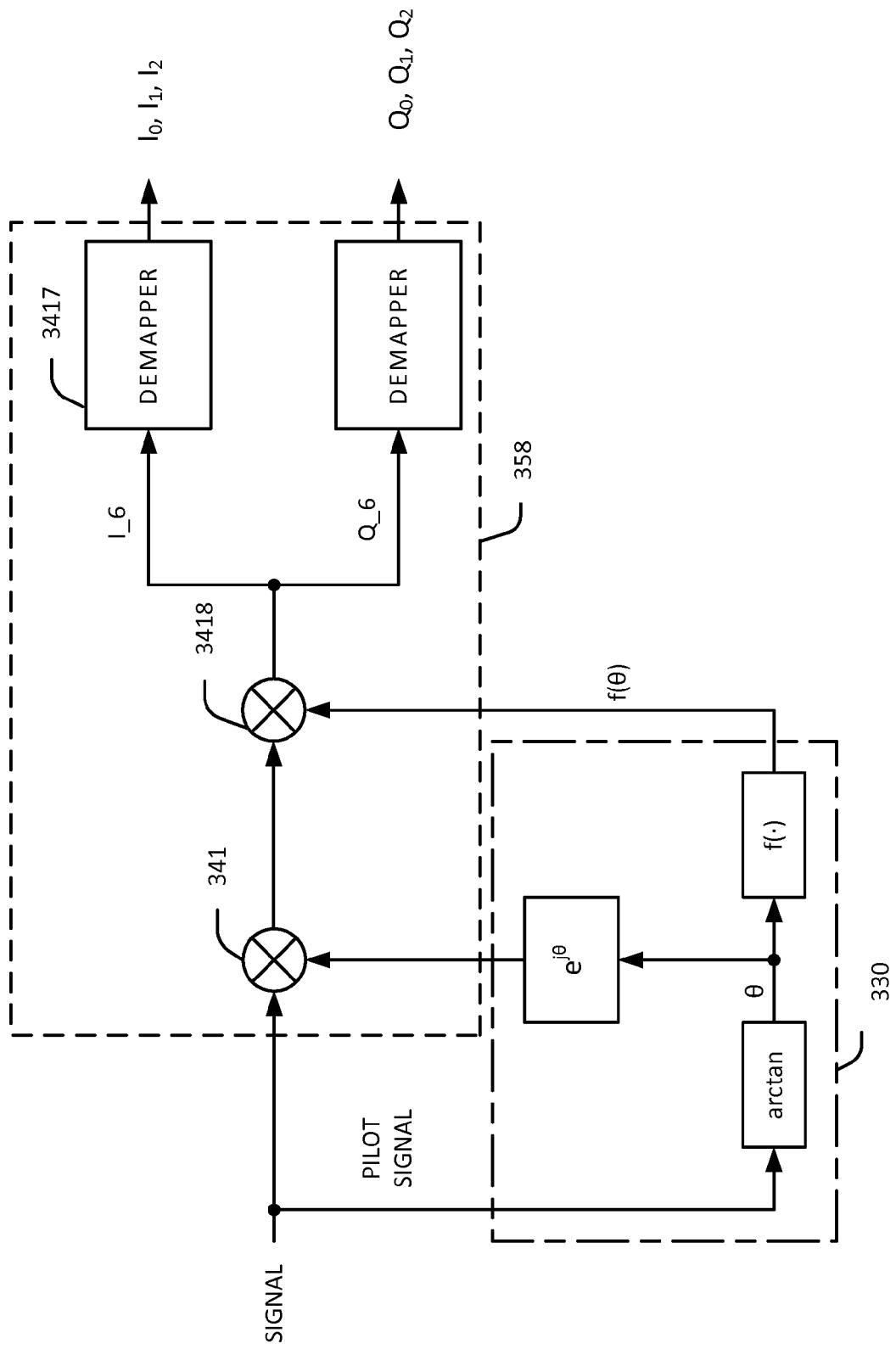
FIG. 8 is a detailed block diagram of the calculating apparatus and the signal adjusting apparatus according to the first embodiment.

FIG. 8 is a detailed block diagram of the calculating apparatus 330 and the signal adjusting apparatus 358 according to the first embodiment. In the embodiment, the value input into the multiplier 341 is multiplied by the weight f(Θ) via the multiplier 3418 and then is present as I_6 and Q_6, so I coordinate and Q coordinate can share the same multiplier. Then the soft values $I_0, I_1$ and $I_2$ are generated by the demapper 3417. Calculation for Q coordinate is similar, and the rest operation is similar to the above, so it is not repeated here.

Figure 9:
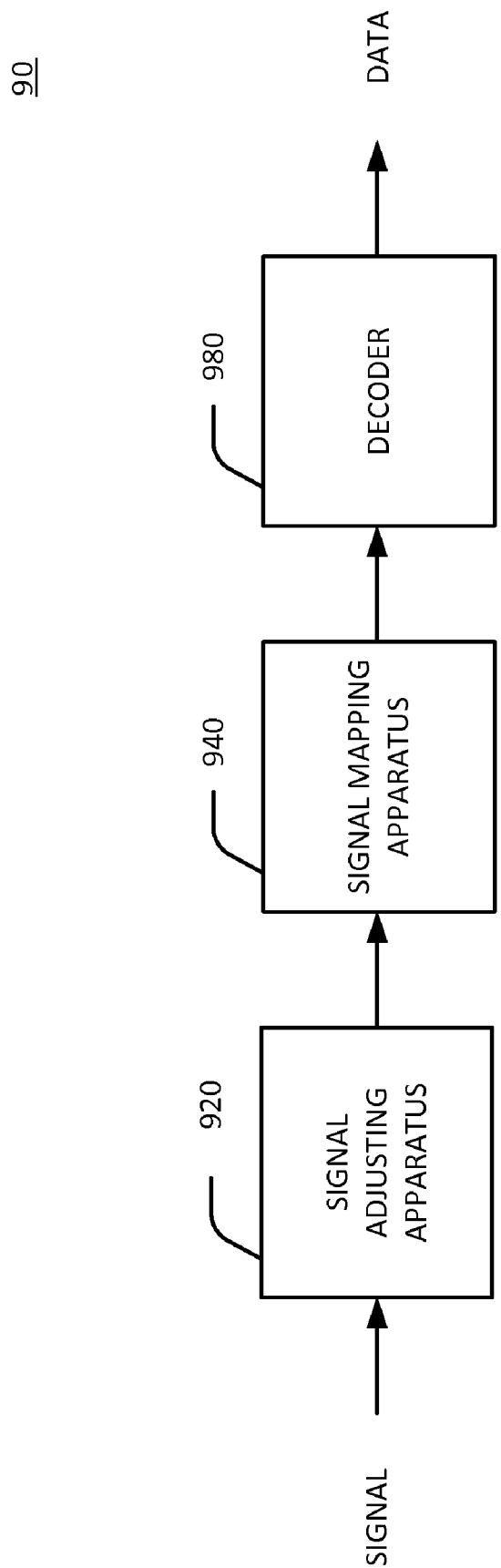
FIG. 9 is a block diagram of a signal processing system 90 according to a second embodiment of the present disclosure.

FIG. 9 is a block diagram of a signal processing system 90 according to a second embodiment of the present disclosure. The system 90 comprises a signal adjusting apparatus 920, a signal mapping apparatus 940 and a decoder 980.

The signal adjusting apparatus 920 calculates a phase error Θ of the received signal to generate a phase calibration value $e^{j\Theta}$. The signal adjusting apparatus 920 obtains a weight f(Θ) according to a function f(x), the function of phase error. For example, the weight f(Θ) is inversely proportional to the phase error Θ. The function f(x) is $f(x)=k1/(k2+x^i)$ for example, where k1 and k2 are real numbers, and i is positive integer. The signal adjusting apparatus 920 adjusts the received signal to generate the adjusted signal further according to the phase calibration value $e^{j\Theta}$ and the weight f(Θ). And, the signal comprises an in-phase signal and a quadrature-phase signal. The phase error may be related to sampling time offset (STO), carrier frequency offset (CFO), phase noise or sampling clock offset (SCO). The signal mapping apparatus 940 maps the adjusted signal to a plurality of soft values. The decoder 980 decodes the soft values to output data.

Figure 10:
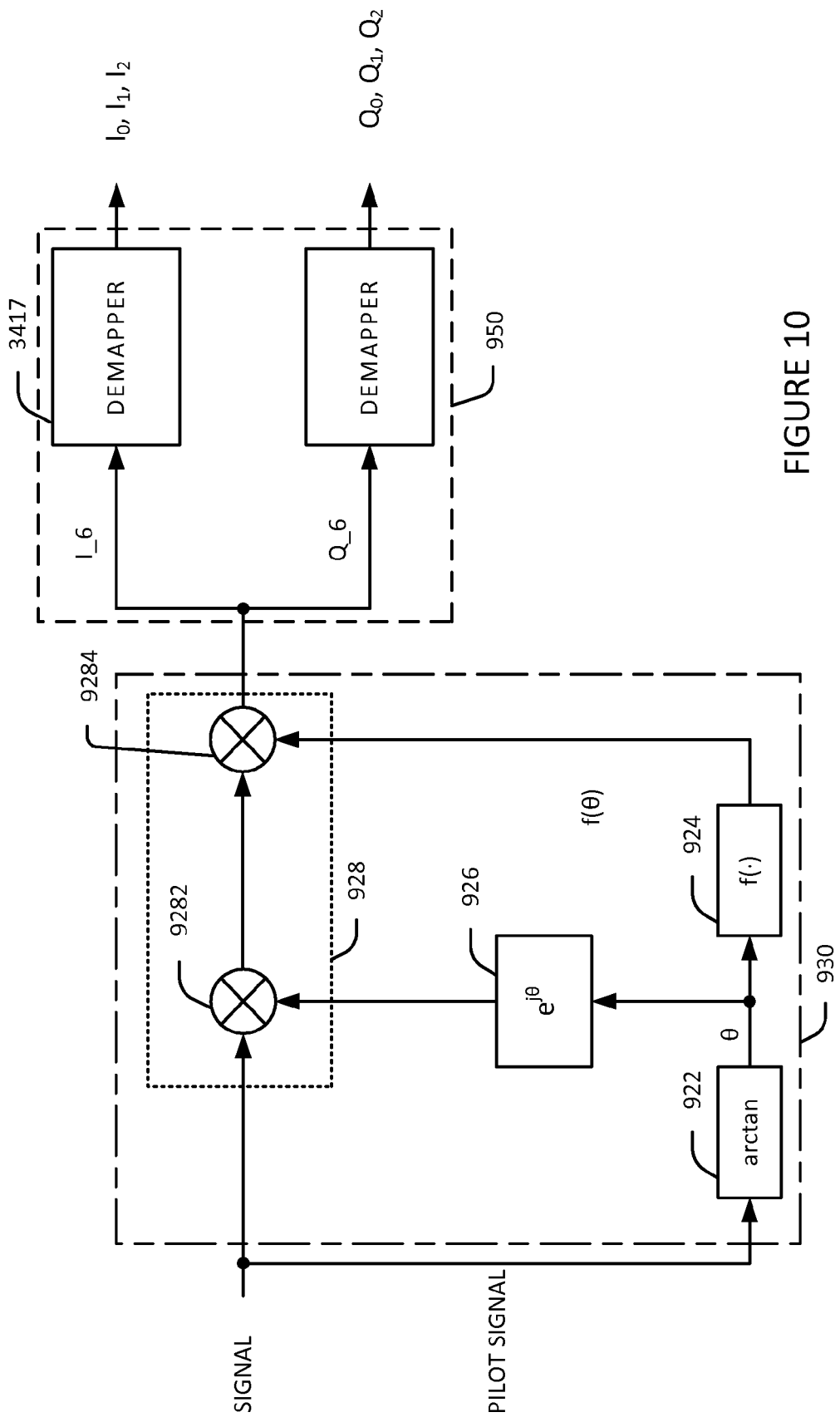
FIG. 10 is a detailed block diagram of the signal adjusting apparatus and the signal mapping apparatus according to the second embodiment.

FIG. 10 is a detailed block diagram of the signal adjusting apparatus 930 and the signal mapping apparatus 950 according to the second embodiment. The signal adjusting apparatus 930 comprises a phase error calculating unit 922, a weight calculating unit 924, a phase calibration value generating unit 926 and a multiplier 928. The multiplier 928 comprises multipliers 9282 and 9284.

The phase error calculation unit 922 calculates the phase error Θ according to the pilot signal of the received signal. The weight calculating unit 924 transforms the phase error Θ to the weight f(Θ) according to the function. The phase calibration value generating unit 926 generates the phase calibration value $e^{j\Theta}$ according to the phase error. The multiplier 9282 multiplies the signal by the phase calibration value $e^{j\Theta}$ for adjusting the signal. The multiplier 9284 multiplies the adjusted signal by the weight f(Θ) for further adjusting the signal to solve the phase error in the system. So, the signal processing system 90 can process the signal more correctly. It is noted that the multipliers 9282 and 9284 can also be realized by a single multiplier, not limited to plurality of multipliers. The signal mapping apparatus 950 presents the signal as I coordinate value and Q coordinate value. I coordinate value and Q coordinate value further passes the demapper 3417 to generate the soft values $I_0, I_1, I_2, Q_0, Q_1$ and $Q_2$.

Figure 11:
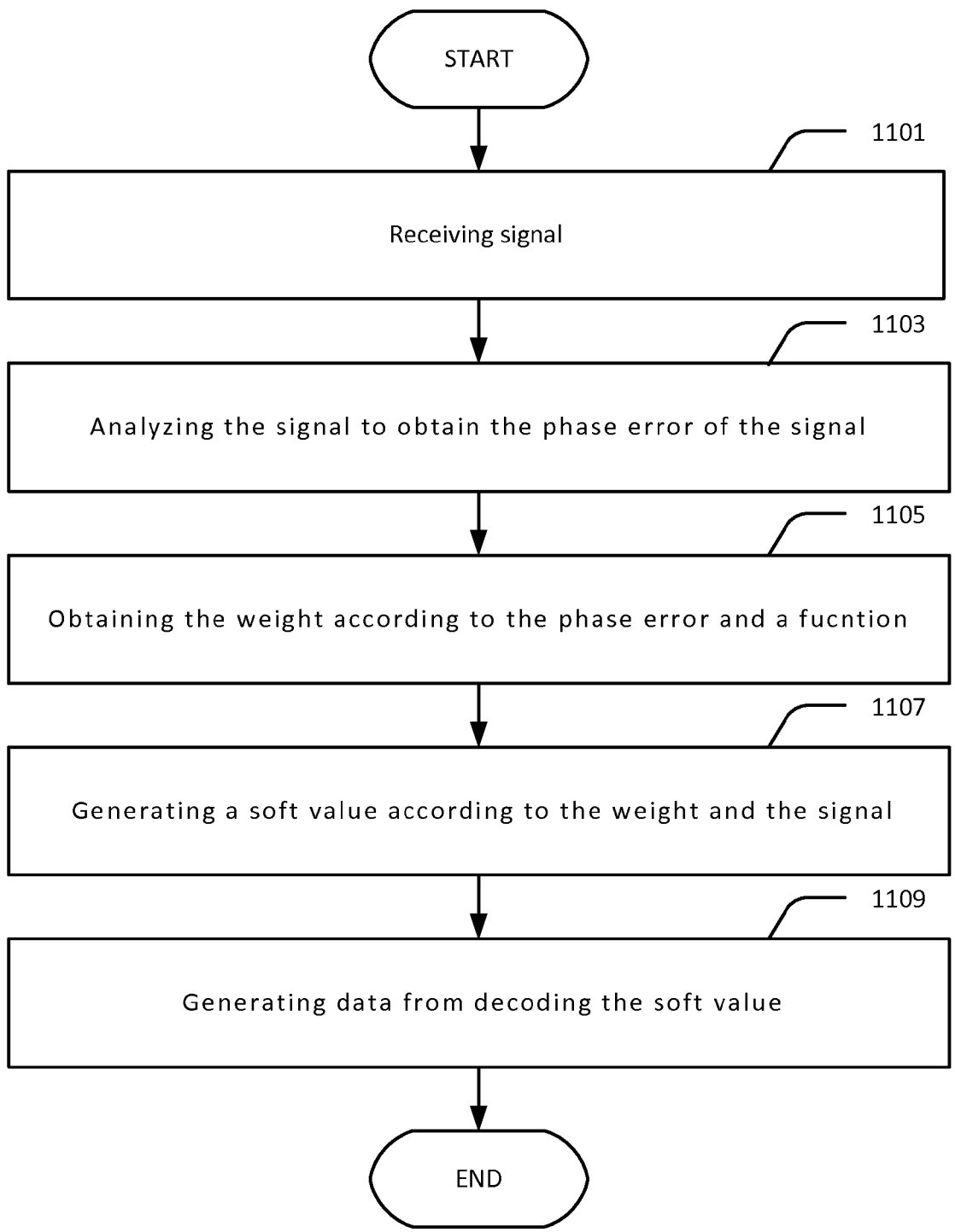
FIG. 11 is a flowchart of a signal processing method according to a third embodiment of the present disclosure.

FIG. 11 is a flowchart of a signal processing method according to a third embodiment of the present disclosure. Step 1101 is receiving a signal, wherein the signal comprises a plurality of complex data, and the signal also comprises an in-phase signal and a quadrature signal. Step 1103 is analyzing the signal to obtain a phase error Θ of the signal, wherein one can select only a part of the signal for obtaining the phase error, and the phase error is related to sampling time offset (STO), carrier frequency offset (CFO), phase noise or sampling clock offset (SCO). Then, a phase calibration value $e^{j\Theta}$ is generated according to the phase error Θ, and the signal is calibrated by the phase calibration value $e^{j\Theta}$. Step 1105 is obtaining a weight f(Θ) according to the phase error Θ and a function f(x). For example, the weight f(Θ) is inversely proportional to the phase error Θ, and the function is $f(x)=k1/(k2+x^i)$, where k1 and k2 are real numbers, and i is positive. Then the signal is adjusted by the weight f(Θ) or by the weight f(Θ) and the phase calibration value $e^{j\Theta}$ simultaneously to generate an adjusted signal. Step 1107 is generating a plurality of soft values according to the weight f(Θ), the signal and the calibrated signal or the adjusted signal. Step 1109 is decoding the soft values to generate data.

From the above, the present disclosure can solve the phase error existing in the signal processing system. If the decoder can receive the information about the phase error, the data can be more correctly decoded. Hence, the present disclosure provides a signal processing system and method thereof to adjust the signal by the phase error of the signal such that the signal processing system can have better performance.

While the present disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A signal processing system, for processing a received signal, the system comprising:
   a calculating apparatus, comprising:
      a phase error calculating unit that calculates a phase error according to at least a part of the received signal;
      a weight calculating unit, coupled to the phase error calculating unit, that generates a weight from a function of the phase error; and
      a phase calibration value generating unit that generates a phase calibration value according to the phase error;
   a signal adjusting apparatus, coupled to the calculating apparatus, that calibrates the received signal according to the phase calibration value and generates a plurality of soft values according to the weight and the calibrated received signal, the signal adjusting apparatus comprising:
      a plurality of mapping function units that map the calibrated received signal to a plurality of function values;
      a plurality of multipliers, coupled to the mapping function units, that multiply the function values by the weight to generate a plurality of adjusted values; and
      a plurality of quantizing units, coupled to the multipliers, that quantize the adjusted values to the soft values; and
   a decoder, coupled to the signal adjusting apparatus, that decodes the soft values to generate data.

2. The system according to claim 1, wherein the function is $f(x)=k1/(K2+x^i)$, wherein x represents the phase error, k1 and K2 are real numbers greater than 0, and i is a positive integer.

3. The system according to claim 1, wherein the signal adjusting apparatus comprises:
   a plurality of mapping function units that map the calibrated signal to a plurality of function values;
   a plurality of quantizing units, coupled to the mapping function units, that quantize the function values to generate a plurality of intermediate values;
   a plurality of multipliers, coupled to the quantizing units, that multiply the intermediate values by the weight to generate a plurality of adjusted values; and
   a plurality of deinterleaving units, coupled to the multipliers, that deinterleave the adjusted values to generate the soft values.

4. The system according to claim 1, wherein the signal adjusting apparatus comprises:
   a plurality of mapping function units that map the calibrated signal to a plurality of function values;
   a plurality of quantizing units, coupled to the mapping function units, that quantize the function values to generate a plurality of intermediate values;
   a plurality of deinterleaving units, coupled to the quantizing units, that deinterleave the intermediate values to a plurality of deinterleaving values; and
   a plurality of multipliers, coupled to the deinterleaving units, that multiply the deinterleaving values by the weight to generate the soft values.

5. The system according to claim 1, wherein the signal adjusting apparatus comprises:
   at least one multiplier that multiplies the calibrated signal by the weight to output a plurality of adjusted values; and
   a plurality of demappers, coupled to the at least one multiplier, that demap the adjusted values to generate the soft values.

6. The system according to claim 1, wherein the weight is inversely proportional to the phase error.

7. The system according to claim 1, wherein the phase error is related to a sampling time offset (STO), a carrier frequency offset (CFO), a phase noise, or a sampling clock offset (SCO).

8. The system according to claim 1, wherein the received signal comprises an in-phase signal and a quadrature-phase signal.

9. A signal processing method, for processing a received signal in accordance with an original signal transmitted from a remote end, the method comprising:
   analyzing the received signal to obtain a phase error;
   obtaining a weight according to the phase error and a function of the phase error;
   generating a plurality of soft values according to the weight and the received signal; and
   decoding the soft values to generate data associated with the original signal,
   wherein the function of the phase error is $f(x)=k1/(K2+x^i)$, wherein x represents the phase error, k1 and K2 are real numbers greater than 0, and i is a positive integer.

10. The method according to claim 9, wherein the received signal comprises a plurality of complex data, and analyzing the received signal comprises selecting a part of the complex data to obtain the phase error.

11. The method according to claim 9, wherein the weight is inversely proportional to the phase error.

12. The method according to claim 9, wherein the phase error is related to a sampling time offset (STO), a carrier frequency offset (CFO), a phase noise, or a sampling clock offset (SCO).

13. The method according to claim 9, further comprising:
   generating a phase calibration value according to the phase error;
   calibrating the received signal by the phase calibration value; and
   transforming the calibrated signal to the soft values according to the weight.

14. The method according to claim 9, wherein generating a plurality of soft values according to the weight and the received signal comprises:
   adjusting the received signal by the weight to generate an adjusted signal; and
   transforming the adjusted signal to the plurality of soft values.

15. The method according to claim 9, wherein generating a plurality of soft values according to the weight and the received signal comprises:
   calculating a phase error calibration value according to the phase error;
   adjusting the received signal to generate an adjusted signal by the weight and the phase calibration value; and
   transforming the adjusted signal to the soft values.

16. A signal processing system, for processing a received signal, the system comprising:
   a calculating apparatus, comprising:
      a phase error calculating unit that calculates a phase error according to the received signal;
      a weight calculating unit, coupled to the phase error calculating unit, that generates the weight from a function: $f(x)=k1/(k2+x^i)$,
      wherein x represents the phase error, K1 and K2 are real numbers greater than 0, and i is a positive integer;
   a signal adjusting apparatus, coupled to the calculating apparatus, that generates a plurality of soft values according to the weight and the received signal; and
   a decoder, coupled to the signal adjusting apparatus, that decodes the soft values to generate data.

\* \* \* \* \*